(12) United States Patent
Rakhmailov

(10) Patent No.: US 6,397,576 B1
(45) Date of Patent: Jun. 4, 2002

(54) GAS TURBINE ENGINE WITH EXHAUST COMPRESSOR HAVING OUTLET TAP CONTROL

(75) Inventor: Anatoly Rakhmailov, Batayski (RU)

(73) Assignee: ALM Development, Inc., Washington, DC (US)

( * ) Notice: Subject to any disclaimer, the term of this patent is extended or adjusted under 35 U.S.C. 154(b) by 0 days.

(21) Appl. No.: 09/632,321

(22) Filed: Aug. 4, 2000

Related U.S. Application Data

(60) Provisional application No. 60/158,934, filed on Oct. 12, 1999, provisional application No. 60/158,935, filed on Oct. 12, 1999, provisional application No. 60/158,929, filed on Oct. 12, 1999, provisional application No. 60/159,065, filed on Oct. 12, 1999, and provisional application No. 60/159,066, filed on Oct. 12, 1999.

(51) Int. Cl.[7] ............................. F02C 7/00; F02C 6/08
(52) U.S. Cl. ................ 60/39.162; 60/39.41; 60/726; 60/39.511; 415/169.1
(58) Field of Search ............... 60/39.07, 39.162, 60/39.41, 39.5, 39.511; 415/169.1, 145

(56) References Cited

U.S. PATENT DOCUMENTS

| | | |
|---|---|---|
| 1,388,707 A | 8/1921 | Heinze |
| 1,732,234 A | 10/1929 | Jensky |
| 1,868,143 A | 7/1932 | Heinz |
| 2,303,381 A | 12/1942 | New |
| 2,354,213 A | 7/1944 | Jendrassik |
| 2,410,259 A | 10/1946 | Birmann |
| 2,469,678 A * | 5/1949 | Wyman ...................... 60/39.41 |
| 2,579,049 A | 12/1951 | Price |
| 2,715,011 A | 8/1955 | Schorner |
| 2,784,551 A | 3/1957 | Karlby et al. |
| 2,821,067 A | 1/1958 | Hill |
| 2,823,520 A | 2/1958 | Spalding |
| 3,034,298 A | 5/1962 | White |
| 3,209,536 A | 10/1965 | Howes et al. |
| 3,280,555 A | 10/1966 | Charpentier et al. |
| 3,287,904 A | 11/1966 | Warren et al. |
| 3,369,361 A * | 2/1968 | Craig ...................... 60/39.41 |
| 3,469,396 A | 9/1969 | Onishi et al. |

(List continued on next page.)

FOREIGN PATENT DOCUMENTS

| | | |
|---|---|---|
| CH | 223 843 | 10/1942 |
| CH | 258 675 | 12/1948 |
| CH | 384 942 | 2/1965 |
| DE | 2332698 | 1/1974 |
| DE | 2335594 | 8/1974 |
| DE | 2437990 | 2/1976 |
| DE | 3713923 | 11/1987 |
| DE | 3835932 | 4/1990 |
| DE | 2018641 | 10/1991 |
| DE | 4331779 | 3/1995 |
| EP | 0103370 | 3/1984 |
| FR | 882329 | 5/1943 |

(List continued on next page.)

Primary Examiner—Ted Kim
(74) Attorney, Agent, or Firm—Hughes Hubbard & Reed; Ronald Abramson; Peter A. Sullivan

(57) ABSTRACT

A gas turbine engine comprising a turbine mounted downstream of a compressor and a heat exchanger interconnected between the turbine and compressor and to a heated fluid source, which is connected to a fuel source, has a compressor flow duct having a plurality of flow duct areas, each providing a different compression ratio, and a plurality of outlet taps, each communicating with a respective area of the plurality of flow duct areas, that supplies combustion air to the gas turbine engine flow duct and also controls an outlet tap switch having a plurality of positions for selectively opening to the atmosphere one outlet tap and disconnecting the rest of the outlet taps from the atmosphere in each switch position.

6 Claims, 6 Drawing Sheets

U.S. PATENT DOCUMENTS

| | | | |
|---|---|---|---|
| 3,625,003 A | 12/1971 | Liddle et al. | |
| 3,699,681 A | 10/1972 | Frutschi | |
| 3,703,808 A | 11/1972 | Stearns | |
| 3,727,401 A | 4/1973 | Fincher | |
| 3,751,911 A | 8/1973 | Tartaglia | |
| 3,775,974 A | 12/1973 | Silver | |
| 3,826,084 A | 7/1974 | Branstrom et al. | |
| 3,883,263 A | 5/1975 | Mai | |
| 3,886,732 A | 6/1975 | Gamell | |
| 3,971,209 A | 7/1976 | de Chair | |
| 4,003,199 A | 1/1977 | Bell, III et al. | |
| 4,022,544 A | 5/1977 | Garkusa | |
| 4,024,705 A | 5/1977 | Hedrick | |
| 4,084,922 A | 4/1978 | Glenn | |
| 4,142,836 A | 3/1979 | Glenn | |
| 4,193,568 A | 3/1980 | Heuvel | |
| 4,213,297 A | 7/1980 | Foster et al. | |
| 4,277,938 A | 7/1981 | Belke et al. | |
| 4,311,431 A | 1/1982 | Barbeau | |
| 4,329,114 A * | 5/1982 | Johnston et al. | 60/726 |
| 4,338,780 A | 7/1982 | Sakamoto et al. | |
| 4,338,781 A | 7/1982 | Belke et al. | |
| 4,370,094 A | 1/1983 | Ambrosch et al. | |
| 4,501,053 A | 2/1985 | Craig et al. | |
| 4,502,277 A * | 3/1985 | Papastavros | 60/39.41 |
| 4,522,557 A | 6/1985 | Bouiller et al. | |
| 4,549,402 A | 10/1985 | Saintsbury et al. | |
| 4,641,495 A * | 2/1987 | Mowill | 60/726 |
| 4,791,784 A | 12/1988 | Minardi et al. | |
| 4,817,858 A | 4/1989 | Verpoort | |
| 4,991,391 A | 2/1991 | Kosinski | |
| 5,054,279 A | 10/1991 | Hines | |
| 5,123,242 A | 6/1992 | Miller | |
| 5,148,670 A * | 9/1992 | Birch et al. | 60/39.41 |
| 5,201,796 A | 4/1993 | Glinski et al. | |
| 5,232,335 A | 8/1993 | Narayana et al. | |
| 5,269,133 A | 12/1993 | Wallace | |
| 5,385,012 A | 1/1995 | Rowe | |
| 5,473,881 A | 12/1995 | Kramnik et al. | |
| 5,762,156 A | 6/1998 | Bates et al. | |
| 6,145,296 A * | 11/2000 | Rakhmailov | 60/39.162 |
| 6,212,871 B1 * | 4/2001 | Rakhmailov | 60/39.162 |

FOREIGN PATENT DOCUMENTS

| | | |
|---|---|---|
| FR | 1163559 | 9/1958 |
| FR | 1166419 | 11/1958 |
| FR | 2385899 | 10/1998 |
| GB | 196452 | 4/1923 |
| GB | 412970 | 7/1934 |
| GB | 413697 | 7/1934 |
| GB | 720436 | 12/1954 |
| GB | 753652 | 7/1956 |
| GB | 801281 | 9/1958 |
| GB | 803994 | 11/1958 |
| GB | 1435687 | 5/1976 |
| JP | 11159345 | 6/1999 |
| RU | 1774290 | 6/1992 |
| RU | 2050455 | 12/1995 |
| RU | 2052145 | 1/1996 |
| WO | WO 9505063 | 2/1995 |

* cited by examiner

US 6,397,576 B1

GAS TURBINE ENGINE WITH EXHAUST COMPRESSOR HAVING OUTLET TAP CONTROL

This application claims the benefit of U.S. Provisional Application No. 60/158,934 filed on Oct. 12, 1999, and also cross-references nine U.S. patent applications, Ser. Nos. 09/161,104, 09/161,114, 09/161,115 now U.S. Pat No. 6,305,157 and 09/161,170 now U.S. Pat. No. 6,145,296, all of which were filed on Sep. 25, 1998, and Ser. Nos. 09/267,893, 09/267,894, 09/267,895 now U.S. Pat. No. 6,189,311, 09/267,896 now U.S. Pat. No. 6,272,844 and 09/267,897 now U.S. Pat. No. 6,212,871 all of which were filed on Mar. 11, 1999, and also four co-pending U.S. provisional patent applications, Ser. Nos. 60/158,935, 60/158,929, 60/159,065 and 60/159,066, all of which were filed on Oct. 12, 1999. Each of the above is incorporated by reference herein.

The invention relates to the field of gas turbine engines, and more specifically, to gas turbines that maintain control of fluid density to control system operation and minimize losses.

BACKGROUND OF THE INVENTION

A conventional gas turbine engine comprising a compressor, a turbine mounted downstream of the compressor, a heat exchanger, a heated fluid source connected to a source of fuel, and a source of combustion air, has a device for removing excessive waste fluid from the gas turbine engine flow duct and replacing it with air to sustain combustion and to control fluid density in the gas turbine engine flow duct to control engine power. The device for removing excessive waste fluid from the gas turbine engine flow duct is normally a throttling valve or an auxiliary turbine. To control the fluid density in the engine flow duct, the operator increases the fuel and the air supplied to the heated fluid source, and excessive waste fluid is exhausted from the engine flow duct by throttling or expanding in an auxiliary turbine. Throttling the excessive waste fluid into the atmosphere causes enormous energy losses. If the excessive waste fluid is expanded in an auxiliary turbine that is used for certain gas turbine engine or subsystems needs, a part of the energy from the excessive waste fluid is recovered. However, in both cases, the part of the waste fluid that is going to be exhausted first passes through the flow duct of the gas turbine engine and acquires a certain amount of energy which is irrecoverably lost after this part of the waste fluid has been exhausted. In addition, controlling the gas turbine engine by adding air into the flow duct to replace a part of the waste fluid and by removing the excessive waste fluid from the gas turbine engine flow duct by throttling or by expanding in the auxiliary turbine is rather sluggish because of the substantial inertia of the waste fluid mass in the flow duct. Accordingly, engine response is rather slow with this control method. Still another disadvantage of the prior art is the need to exhaust the hot waste fluid (at about 400° C.) through a throttle valve or through an auxiliary turbine which because of the high temperature to which it is exposed must be constructed with more exacting manufacturing tolerances using special materials. The cost of such devices is rather high, and their reliability in operation is limited. Moreover, releasing hot gases into the atmosphere is environmentally unfriendly.

It is an object of the invention to provide a gas turbine engine which has a greater efficiency.

Another object of the invention is to provide a gas turbine engine which can be effectively controlled without sluggishness.

Yet another object of the invention is to provide a gas turbine engine which is easier and less expensive to manufacture and is more reliable to operate.

Finally, it is an object of the invention to lower the environmental impact of the gas turbine engine.

SUMMARY OF THE INVENTION

The above and other objects of the invention are accomplished by providing a gas turbine engine in which a compressor flow duct has a plurality of flow duct areas, each providing a different compression ratio, and a plurality of outlet taps, each communicating with a respective area of the plurality of flow duct areas. The engine has a turbine mounted downstream of the compressors and a heat exchanger. The inlet of the compressor is connected to a first outlet of the heat exchanger which has its first inlet connected to the outlet of the turbine. A second inlet of the heat exchanger is connected to the outlet of the compressor. A heated fluid source, which is connected to a fuel source, is provided upstream of the turbine and connects to a second outlet of the heat exchanger. The engine has a device for supplying combustion air to the gas turbine engine flow duct and also has an outlet tap switch which has a plurality of positions for selectively opening to the atmosphere one outlet tap and disconnecting the rest of the outlet taps from the atmosphere in each position of the switch. A switch control moves the switch to one position of the plurality of positions.

Other objects and advantages of the invention will become apparent from the following description of preferred embodiments thereof with reference to the accompanying drawings.

DETAILED DESCRIPTION OF THE DRAWINGS

Figure 1:
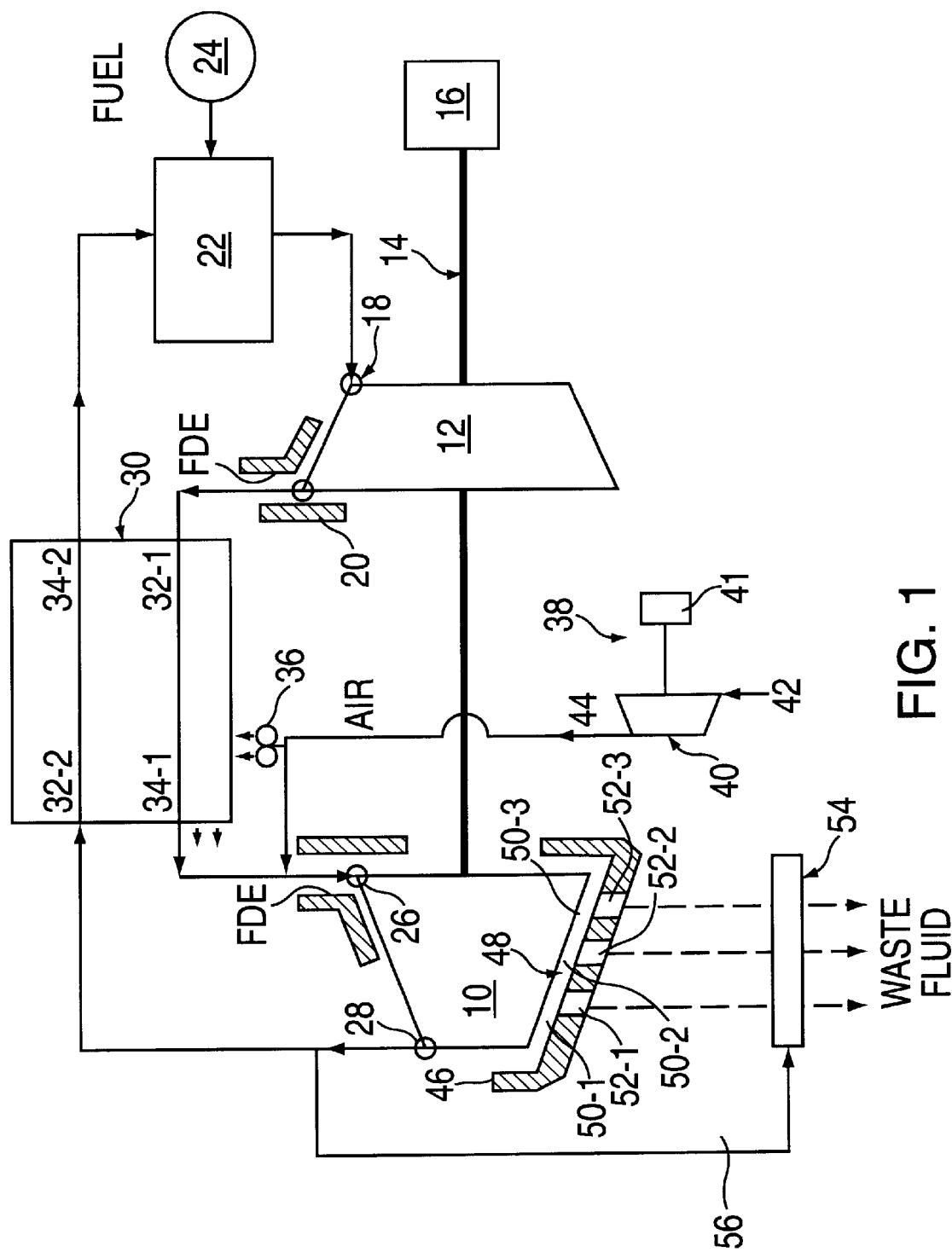
FIG. 1 is a schematic view of a gas turbine engine according to the invention.

With reference to FIG. 1, a gas turbine engine has a compressor generally shown at 10 and a turbine 12 installed on a shaft 14 which is coupled to a load 16. Compressor 10 may be installed on shaft 14 as turbine 12, or compressor 12 may have an independent drive (e.g., another turbine stage). This is immaterial for the purposes of this invention. Turbine 12 has an inlet 18 and an outlet 20. Inlet 18 of turbine 12 is connected to a heated fluid source 22 (combustor) that is mounted upstream turbine 12. Heated fluid source 22 is connected to a fuel source 24, which is controlled by any appropriate known means which does not have a direct bearing on the invention. Compressor 10 has an inlet 26 and an outlet 28. A heat exchanger 30 has a first inlet 32-1, a second inlet 32-2, a first outlet 34-1, and a second outlet 34-2. A fan 36 provides additional cooling for the core of heat exchanger 30. Outlet 20 of turbine 12 is connected to first inlet 32-1 of the heat exchanger, and first outlet 34-1 of the heat exchanger is connected to inlet 26 of the compressor 10 to make one circuit of the heat exchanger. Outlet 28 of compressor 10 is connected to second inlet 32-2 of heat exchanger 30, and second outlet 34-2 of heat exchanger 30 is connected to the heated fluid source 22 to make another circuit of the heat exchanger. A combustion air source 38 is used to supply air for fuel combustion to the gas turbine engine flow duct shown at FDE. Combustion air source 38 has an air compressor 40 which has an inlet 42 communicating with the atmosphere and an outlet 44 connected to a point in the flow duct of the engine between outlet 20 of turbine 12 and inlet 26 of compressor 10. It is preferred that outlet 44 of air compressor 40 be connected to inlet 26 of compressor 10. Air compressor 40 is powered by a motor 41. It will be apparent to those skilled in the art that air compressor 40 can be driven by turbine 12 or by any other appropriate means.

When the gas turbine engine is in operation, the power of the turbine 12 is controlled by varying the amount of fuel supplied to heated fluid source 22 in accordance with the amount of air supplied to the flow duct of the gas turbine engine. This is normally done by sensing the amount of the air and using the measurement results to the control the fuel supply (i.e., in the manner normally done in direct-injection internal combustion engines). A part of the waste fluid that is formed in the turbine 12 and exits outlet 20 of the turbine 12 through the heat exchanger 30 (32-1 to 34-1) for cooling before being compressed has to be removed from the flow duct FDE of the gas turbine engine to be replaced with air which is added to burn more fuel in heated fluid source 22. In order to remove the excessive amount of the waste fluid from the gas turbine engine flow duct FDE, compressor 10 is designed to allow a part of the waste fluid to be removed before the waste fluid is completely compressed and is directed to the heat exchanger. For this purpose, compressor 10 has outlet taps which are used to remove a part of the waste fluid. A housing 46 of compressor 10 defines a flow duct 48 of compressor 10 shown at FDC which has a plurality of zones such as 50-1, 50-2, 50-3 having different compression ratio percentages relative to the maximum compression ratio of compressor 10. More specifically, if the compression ratio of compressor 10 is 100%, the percentages of the compression ratios will be, e.g., 80%, 50%, and 30% in the zones 50-1, 50-2, 50-3 of the FDC, respectively. With this arrangement, if the maximum compression ratio of compressor 10 is, for example, 4, the compression ratios in zones 50-1, 50-2, and 50-3 will be 3.2; 2.0; and 1.2, respectively. It will be apparent that removing the waste fluid from the different zones of compressor 10 at different compression ratios will allow the waste fluid to be removed at the desired pressure, including the minimum pressure, which is slightly higher than atmospheric pressure. Thus, the losses associated with the replacement of the waste fluid with combustion air can be minimized.

According to the invention, compressor 10 has a plurality of outlet taps 52-1, 52-2 and 52-3, each communicating with one of the plurality of zones 50-1, 50-2 and 50-3 of the flow duct of the compressor, respectively. The number of outlet taps and zones of the compressor flow duct has been chosen here at random. This number chosen is specific for each application depending on the parameters of the compressor, engine rating, and waste fluid parameters. In order to remove the excessive waste fluid through a required outlet tap 52-1, 52-2 or 52-3, there is provided an outlet tap switching device 54 which is connected to the gas turbine engine flow duct FDE through a line 56.

Figure 2:
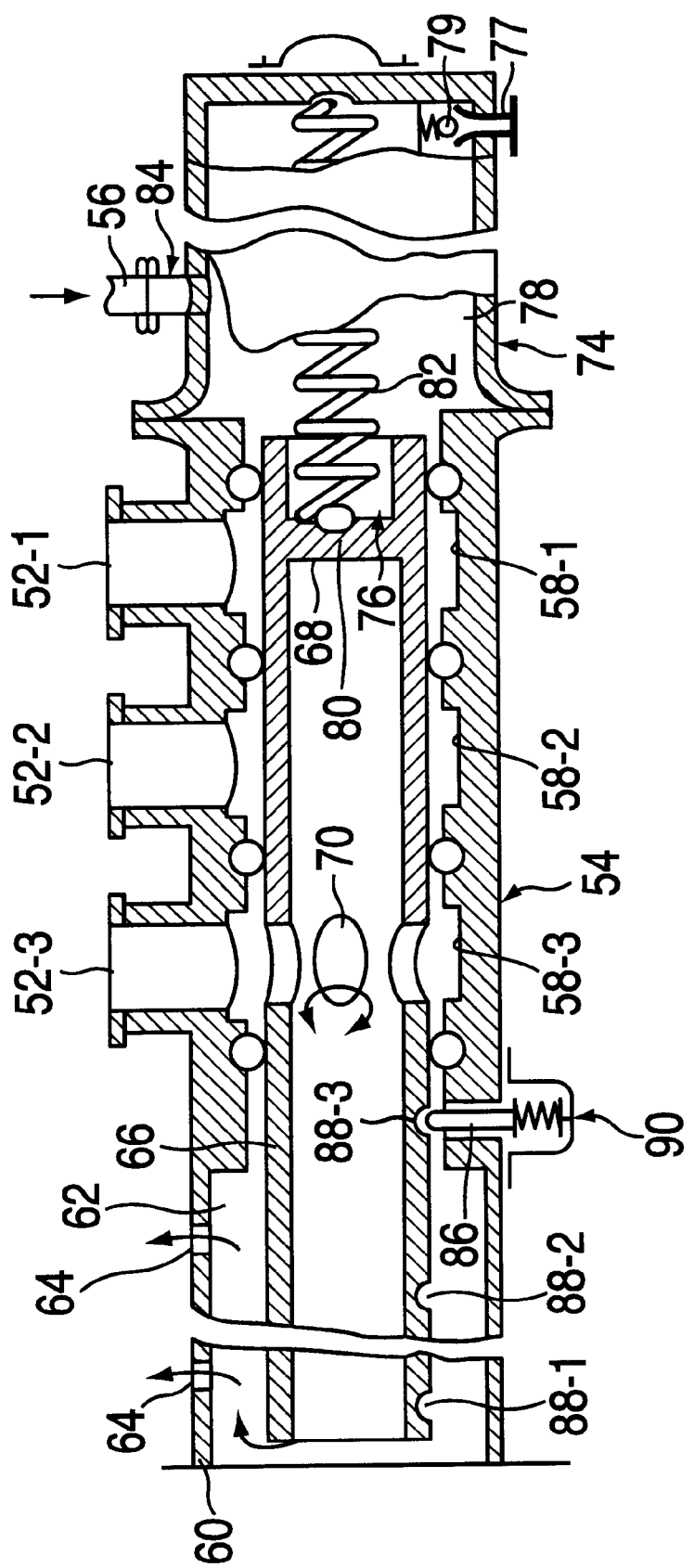
FIG. 2 is a schematic illustration showing the construction of an outlet tap switching device which is used in connection with the gas turbine engine shown in FIG. 1.

In FIG. 2, outlet tap switching device 54 connects to outlet taps 52-1, 52-2, 52-3 and has a plurality of positions 58-1, 58-2 and 58-3. Switching device 54 has a casing 60 with an interior space 62 which communicates with the atmosphere through holes 64. Switching device 54 selectively opens one of outlet taps 52-1, 52-2, and 52-3 to the atmosphere, leaving the other outlet taps closed. Switching device 54 has a closure member 66, e.g., in the form of a hollow cylinder with a bottom wall 68. Closure member 66 has a portion with holes 70 in the peripheral wall. This portion can be aligned with one of outlet taps 52-1, 52-2 and 52-3 when the closure member is moved to one of positions 58-1, 58-2 or 58-3 of switching device 54. Sealing rings 72 are provided in the wall of casing 60 on each side of each of outlet taps 52-1, 52-2 and 52-3 to isolate hole 70 from the other outlet taps. When closure member 66 is moved from one position to another, another outlet tap will communicate with hole 70, and the preceding outlet tap will be disconnected from the atmosphere, as will be the other outlet taps. A control device 74 is provided for moving closure member 66. Control device 74 has an actuator 76 which includes a pressure chamber 78, a piston surface 80 formed by bottom wall 68 of closure member 66, and a return spring 82 which is an expansion spring. An actuator control device 84 is connected through line 56 to the engine flow duct to receive a pressure signal from a point between the compressor outlet and the turbine inlet (FIG. 1). The actuator control device may comprise a pressure converter if it is required to match the pressure in the engine flow duct to the activation pressure of actuator 76. To set the switching device to the initial position before starting the engine, closure member 66 has to be moved to position 58-3 as shown in FIG. 2. In this position, the removal of the waste fluid is carried out from zone 50-3 of compressor 10 (FIG. 1) flow duct at the minimum compression ratio (e.g., 30% of the maximum compressor compression ratio). To set closure member 66 to the initial position before starting, a pressure is fed to a fitting 77 having a check valve 79. This pressure acts upon piston surface 80 to cause closure member 66 to move to the left end of its travel position. It will be apparent that this movement of closure member 66 may be accomplished by any other appropriate means, e.g., manually, by using an electromagnet, or by using a hydraulic actuator.

Switching device 54 has a retaining device which includes recesses 88-1, 88-2 and 88-3 of closure member 66 and a spring loaded retainer 86 with a spring 90, which is engageable with the recesses 88-1, 88-2 and 88-3 to retain the closure member in position after its movement to any next position 58-1, 58-2 and 58-3. When closure member 66 is moved to the left in FIG. 2, and outlet tap 52-3 is aligned with hole 70, closure member 66 is retained by retainer 86 which is received in recess 88-3 of closure member 66. Return spring 82 is expanded in this position, and the force of the return spring is balanced by the pressure supplied through fitting 77. When the engine is being started, the pressure in the flow duct of the engine is initially below the atmospheric pressure, and no fluid comes out through outlet tap 52-3 into the atmosphere. After the engine has been started, the pressure at fitting 77 is removed. Meanwhile, the pressure in the engine flow duct ramps up very fast, and the pressure signal, which is fed through line 56 to actuator control device 84, will act on the piston surface 80. Normally the pressure signal is high enough to counteract the force of return spring 82 and retainer 86, so closure member 66 will remain in position 58-3. During engine operation, the power of turbine 12 may decrease, and the pressure in the engine flow duct will go down. The pressure signal which is fed through line 56 to actuator 74 becomes lower, and return spring 82 will move closure member 66 to the right to position 58-2 corresponding to a compression ratio of 50% of the maximum compression ratio for compressor 10 (FIG. 1). Closure member 66 is retained in this position by retainer 86 received in recess 88-2 of closure member 66. The process is repeated when the pressure decreases further, and closure member 66 will be retained in position 58-1 corresponding to the pressure level of 60% of full compressor pressure. Closure member 66 is retained in this position by retainer 86 received in recess 88-1 of closure member 66. During engine operation, the flow duct pressure will vary and the closure member will move between the various positions. As a result of this movement, the pressure at which the waste fluid is removed will remain substantially the same. Thus, if the pressure in the engine flow duct is 4.0 MPa, the waste fluid will be removed through outlet tap 52-3 at a compression ratio of 30%. When the pressure in the engine flow duct is 2.5 MPa, the waste fluid will be removed through outlet tap 52-2 at a compression ratio of 50%. When the pressure in the engine flow duct is 1.5 MPa, the waste fluid will be removed through outlet tap 52-1 at a compression ratio of 80%. The waste fluid will always be removed at the minimum possible difference between the removal pressure and atmospheric pressure. The energy loss spent for compressing fluid is thus minimized.

Figure 3:
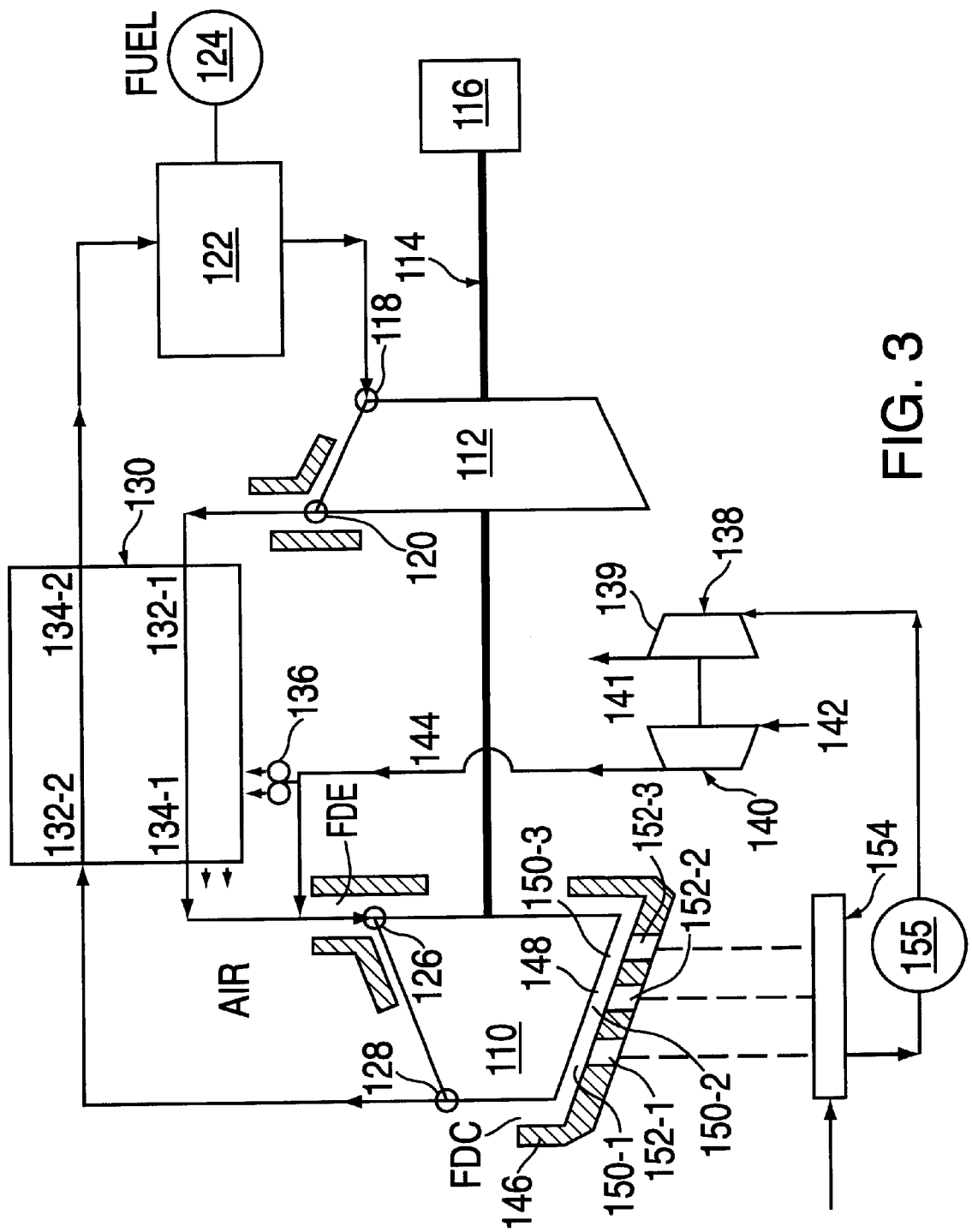
FIG. 3 is a schematic view of another embodiment of a gas turbine engine according to the invention.

In the embodiment of FIG. 3, similar parts are shown using the same reference numerals as in FIG. 1, with the addition of 100. The gas turbine engine shown in FIG. 3 is constructed and operates almost along the same lines as the gas turbine engine shown in FIG. 1. The difference here is that switching device 154 does not have a line communicating with the flow duct of the gas turbine engine. Source of air for combustion 138 also has an air compressor 140 which is connected as in the first embodiment described above. Air compressor 140 is powered by an auxiliary turbine 139 which has an outlet 141 communicating with the atmosphere and an inlet manifold 155 which is connected to switching device 154.

When the gas turbine engine is started, the reduced pressure at inlet 126 of compressor 110 will cause the air from the atmosphere to enter air compressor 140 at inlet 142 by suction, and air is supplied to the gas turbine engine flow duct. The air is compressed in compressor 110 and is fed to a heated fluid source 122 which receives fuel from a fuel source 124. During the initial period of starting, fluid is not coming out of outlet taps 152-1, 152-2, 152-3, and the fluid is not passing through inlet manifold 155 because auxiliary turbine 139 rotates as it is driven by air compressor 140 under the effect of air suction. When the gas turbine engine is started, pressure in the flow duct increases, and the waste fluid will start escaping from the flow duct FDC of compressor 110 through one of the outlet taps. The waste fluid will go to inlet manifold 155 of auxiliary turbine 139. Auxiliary turbine 139 will rotate and will cause air compressor 140 to rotate and to supply air to the flow duct FDE of the gas turbine engine to replace the excessive waste fluid from the flow duct of the engine. To vary the power of turbine 112, switching device 154 can be controlled to selectively open one of outlet taps 152-1, 152-2, 152-3 to discharge an appropriate amount of the waste fluid from the gas turbine engine flow duct FDE. When the waste fluid is removed from the gas turbine engine flow duct under a greater pressure, the power at auxiliary turbine 139 will increase, and air compressor 140 will supply more air for combustion to raise the pressure in the gas turbine engine flow duct, increasing the power of turbine 112. If the speed of turbine 112 decreases under load, the operator can select outlet tap 152-1 which ensures the maximum pressure difference for waste fluid removal, and the amount of combustion air which is supplied by air compressor 140 will be increased to raise the power of turbine 112.

Figure 4:
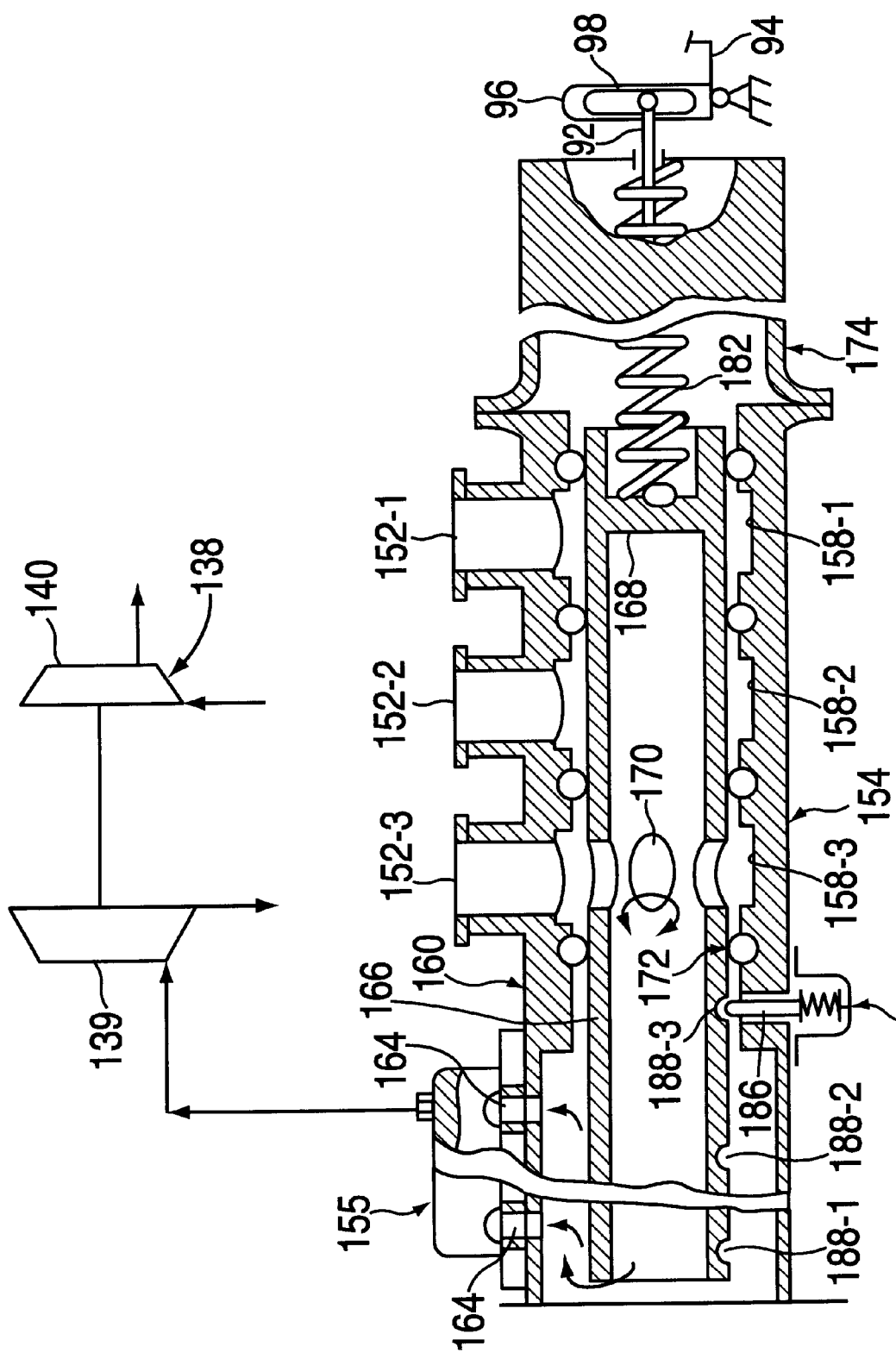
FIG. 4 is a schematic illustration showing the construction of an outlet tap switching device which is used in connection with the gas turbine engine shown in FIG. 3.

FIG. 4 shows a switching device embodiment for the outlet taps for operating the gas turbine engine embodiment described in FIG. 3. In FIG. 4, similar components are shown using the same reference numerals as in FIG. 2, with the addition of 100.

Switching device 154 shown in FIG. 4 is constructed and operates almost along the same lines as switching device 54 shown in FIG. 3. The difference in this embodiment is that closure member 166 is positively controlled by the operator using a rod 92, which is connected to end wall 168 of closure member 166. Rod 92 is a part of actuator 174 which also includes return spring 182, which in this case is a compression spring. The actuator control device has a control 94 (e.g., a pedal) which is coupled to rod 92 by a link 96 engageable with a pivot pin 98 of rod 92.

In the position shown in FIG. 4, the waste fluid escapes through outlet tap 152-3 at the minimum pressure difference as described above with reference to FIG. 2. When it is necessary to raise the power of turbine 112 (FIG. 3), the operator presses pedal 94, rod 92 moves to the right in FIG. 4 and pulls closure member 166 to the right in FIG. 4. This movement will result in opening 170 being aligned with the next outlet tap 152-2, and the waste fluid will escape into inlet manifold 155 of auxiliary turbine 139 at a greater pressure difference. Auxiliary turbine 139 will have more power and will cause air compressor 140 to rotate faster. More air will be supplied by air compressor 140 to the flow duct of the gas turbine engine as described above with reference to FIG. 3. It should be noted that opening 170 may be of a larger size than shown so as to overlap adjacent outlet taps 152-1, 152-2, 152-3 to assure a smooth transition from one pressure difference level to another. In this case, the retainer 186 and the recesses 188-1, 188-2, 188-3 may be dispensed with. When rod 92 moves to the right, return spring 182 compresses. If the operator wants to reduce the amount of combustion air which is supplied to the engine flow duct, the operator releases pedal 94, and compressed return spring 182 will move closure member 166 to the left in FIG. 4 to select the outlet taps with lower pressure level (152-2, 152-3) to open inlet manifold 155 of auxiliary turbine 139. This will result in air compressor 140 decreasing in speed, and a smaller amount of combustion air will be supplied to the engine flow duct to reduce the power of turbine 112.

Figure 5:
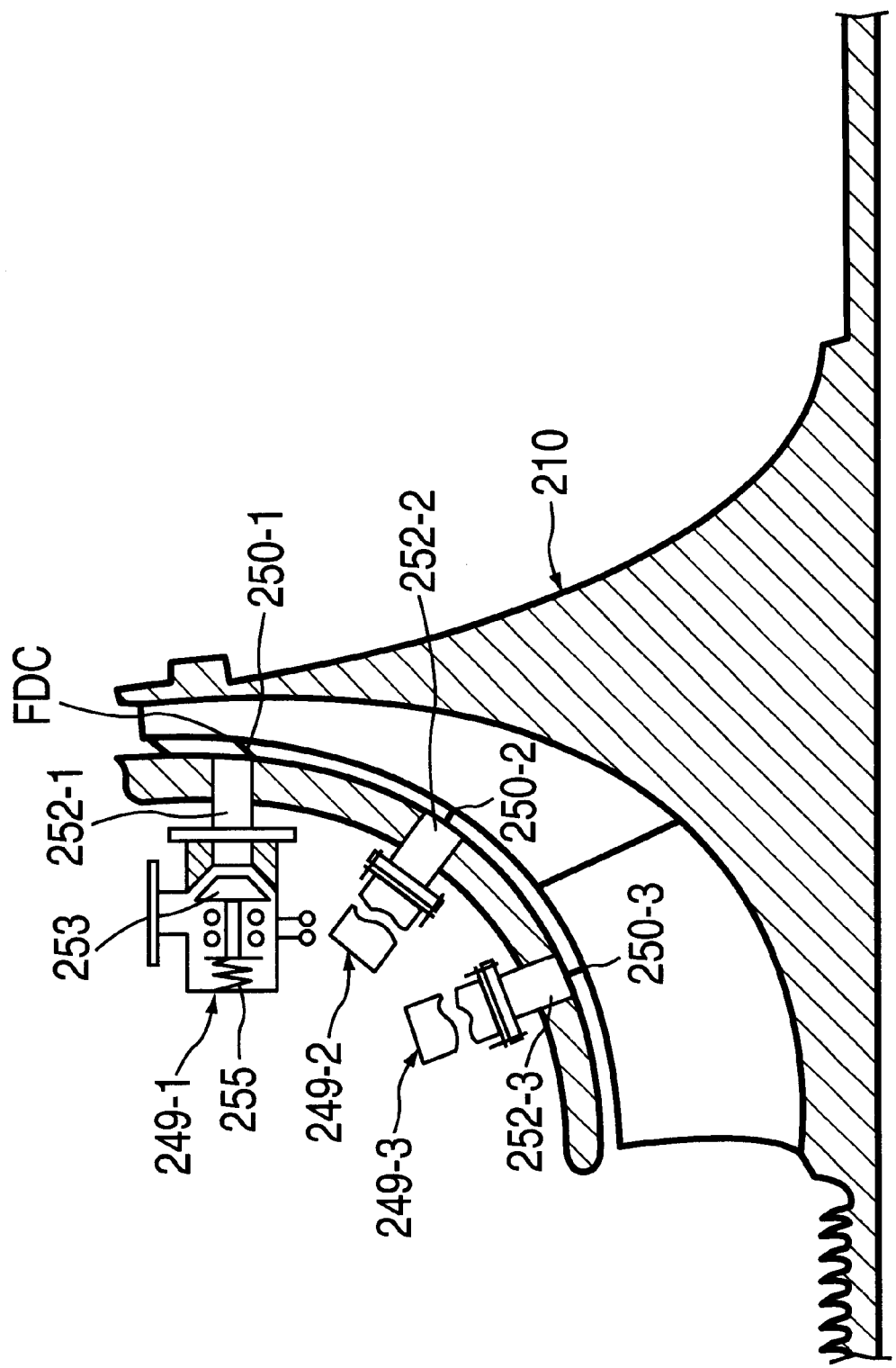
FIG. 5 is a schematic view of a further embodiment of a gas turbine engine according to the invention.
Figure 6:
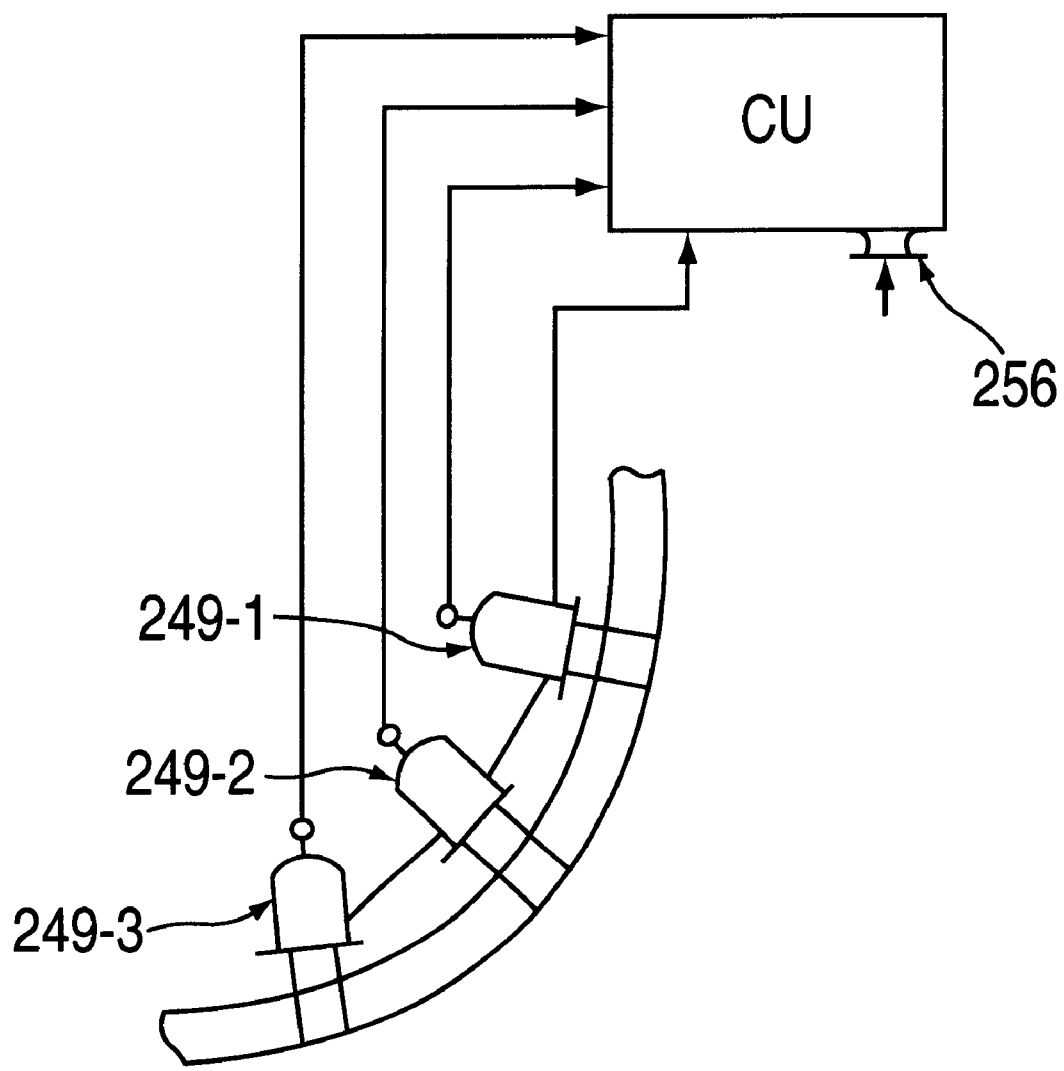
FIG. 6 is a schematic view of a control device used in connection with the embodiment shown in FIG. 5.

FIG. 5 shows an embodiment of the switching device for the outlet taps, in which similar components are shown at the same reference numerals, but using the addition of 200. In this embodiment, each outlet tap has a valve member 249-1, 249-2, 249-3 in the form of an electromagnetic valve 253 with a return spring 255. Each electromagnetic valve 253 closes the respective outlet tap 252-1, 252-2, 252-3 and each electromagnetic valve 253 can be selectively opened. This is done by a control unit CU shown in FIG. 6, which is connected to each valve member 249-1, 249-2, 249-3. Control unit CU functions in such a manner that only one valve member can be opened, e.g., 249-3, while the rest of the valve members, e.g., 249-1, 249-2 will remain closed. Control unit CU may have an input device (not shown) for receiving a pressure signal through line 256 from the gas turbine engine flow duct FDE to switch the outlet taps. The input device may be pressure switches each adjusted for a predetermined pressure level for activation by the pressure signal coming through line 256. Each pressure switch may be connected to a respective valve member 249-1, 249-2, 249-3. When one of the pressure switches is actuated under the effect of the pressure signal from the engine flow duct, valve 255 of the respective valve member which is connected to this specific pressure switch will open the respective outlet tap. For the rest, this embodiment functions in the same manner as the embodiment described with reference to FIGS. 1 and 2. The pressure switches may be replaced by normal relays connected to a switch coupled to a control (e.g., a pedal). In such case, this embodiment will function similarly to the embodiment shown in FIGS. 3 and 4.

In all of the above embodiments, three outlet taps were shown in the compressor. It will be apparent, however, that any number of outlet taps may be used. The greater the number of the outlet taps, the finer the control of the engine speed and power.

It can be seen from the above description that the gas turbine engine according to the invention has a greater efficiency and better response owing to a new method of controlling the replacement of waste fluid in the gas turbine engine flow duct with combustion air.

I claim:

1. A gas turbine engine, said gas turbine engine comprising:
    a gas turbine engine flow duct;
    a compressor having a housing which encloses a compressor flow duct having a plurality of flow duct areas, each providing a different compression ratio, said compressor having an inlet and an outlet and a plurality of outlet taps each communicating with a respective area of said plurality of flow duct areas;
    a turbine mounted downstream of said compressor and having an inlet and an outlet;
    a heat exchanger having a first inlet and a second inlet and a first outlet and a second outlet;
    said compressor inlet being connected to said heat exchanger first outlet;
    said heat exchanger first inlet being connected to said turbine outlet;
    said heat exchanger second inlet being connected to said compressor outlet;
    a heated fluid source provided upstream of said turbine;
    a fuel source connected to said heated fluid source;
    said heat exchanger second outlet being connected to said heated fluid source;
    a combustion air supplying means for said gas turbine engine flow duct;
    an outlet tap switching means having a plurality of positions and selectively opening to the atmosphere one outlet tap of said plurality of outlet taps and disconnecting the rest of said outlet taps of said plurality of outlet taps from the atmosphere in each position of said switching means; and
    a switching means control for selecting one of said plurality of positions of said switching means.

2. The gas turbine engine of claim 1, wherein said switching means control comprises:
    a closure member mounted for movement between a plurality of positions of said closure member and disconnecting from the atmosphere all but one of said plurality of outlet taps after said closure member has completed movement from one position of said plurality of positions to another position;
    an actuator engageable with said closure member for moving said closure member between a plurality of positions of said closure member;
    an actuator control having an inlet which is connected to said gas turbine engine flow duct between said outlet of said compressor and said inlet of said turbine.

3. The gas turbine engine of claim 2, wherein said actuator comprises a retainer means engageable with said closure member for holding said closure member in position after movement of said closure member.

4. The gas turbine engine of claim 3, wherein said switching means control comprises a locking means for locking said actuator engageable with said actuator for preventing said actuator against movement.

5. The gas turbine engine of claim 1 wherein the combustion air supply means comprises:
    an air compressor having an inlet communicating with the atmosphere and an outlet connected to said gas turbine engine flow duct between said turbine outlet and said compressor inlet; and
    an auxiliary turbine coupled to said air compressor for powering said air compressor, said auxiliary turbine having, an outlet communicating with the atmosphere and an inlet manifold.

6. A gas turbine engine, said gas turbine engine comprising:
    a gas turbine engine flow duct;
    a compressor having, a housing which encloses a flow duct of said compressor having a plurality of flow duct areas, each providing a different compression ratio, said compressor having an inlet and an outlet and a plurality of outlet taps each communicating with a respective area of said plurality of flow duct areas;
    a turbine mounted downstream of said compressor and having an inlet and an outlet;
    a heat exchanger having a first inlet and a second inlet and a first outlet and a second outlet;
    said compressor inlet being connected to said heat exchanger first outlet;
    said heat exchanger first inlet being connected to said turbine outlet;
    said heat exchanger second inlet being connected to said compressor outlet;
    a heated fluid source provided upstream of said turbine;
    a fuel source connected to said heated fluid source;
    said heat exchanger second outlet being, connected to said heated fluid source;
    a combustion air supplying means for said gas turbine engine flow duct; and
    an outlet tap switching means having a plurality of valve means, each of said valve means closing a respective outlet tap of said plurality of outlet taps, and a means of controlling each of said valve means for selectively opening to the atmosphere one outlet tap of said plurality of outlet taps.

* * * * *